United States Patent [19]

Suzuki et al.

[11] Patent Number: 5,057,134
[45] Date of Patent: Oct. 15, 1991

[54] PROCESS FOR PRODUCING A GLASS ARTICLE PROTECTED FROM COLORING BY ELECTRON RAYS

[75] Inventors: Kouichi Suzuki; Kazuo Shibaoka, both of Osaka, Japan

[73] Assignee: Nippon Sheet Glass Co., Ltd., Osaka, Japan

[21] Appl. No.: 384,126

[22] Filed: Jul. 24, 1989

Related U.S. Application Data

[62] Division of Ser. No. 146,449, Jan. 21, 1988, Pat. No. 4,897,371.

[30] Foreign Application Priority Data

| Feb. 3, 1987 | [JP] | Japan | 62-23216 |
| Feb. 4, 1987 | [JP] | Japan | 62-24381 |
| Sep. 25, 1987 | [JP] | Japan | 62-241591 |
| Sep. 25, 1987 | [JP] | Japan | 62-241592 |

[51] Int. Cl.$^5$ .............................. C03C 21/00
[52] U.S. Cl. .............................. 65/30.13; 65/30.14
[58] Field of Search .............. 65/30.13, 30.14, 116; 501/70, 72

[56] References Cited

U.S. PATENT DOCUMENTS

| 3,287,200 | 11/1966 | Hess et al. | 65/30.14 |
| 3,357,876 | 12/1967 | Rinehart | 65/30.14 |
| 3,410,673 | 11/1968 | Marusak | 65/30.14 |
| 3,433,611 | 3/1969 | Saunders et al. | 65/30.14 |
| 3,607,172 | 9/1971 | Poole et al. | 65/30.14 |
| 3,637,453 | 1/1972 | Simmons | 65/30.14 |
| 3,798,013 | 3/1974 | Inoue et al. | 65/30.14 |
| 3,844,754 | 10/1974 | Grubb et al. | 65/30.14 |
| 3,959,000 | 5/1976 | Nakagawa et al. | 65/30.14 |
| 4,017,291 | 4/1977 | Gliemeroth et al. | 65/30.14 |
| 4,134,746 | 1/1979 | Levene et al. | 65/30.14 |
| 4,156,755 | 5/1979 | Rinehart | 65/30.14 |
| 4,192,689 | 3/1980 | Rinehart | 65/30.14 |
| 4,218,230 | 8/1980 | Hogan | 65/30.14 |
| 4,273,832 | 6/1981 | Hogan | 65/30.14 |
| 4,455,160 | 6/1984 | Rittler | 65/30.14 |
| 4,472,030 | 9/1984 | Tachibana et al. | 65/30.14 |
| 4,846,868 | 7/1989 | Aratani | 65/30.14 |
| 4,872,896 | 10/1989 | LaCourse et al. | 65/30.14 |

FOREIGN PATENT DOCUMENTS

| 50-105705 | 8/1975 | Japan . |
| 62-153148 | 7/1987 | Japan . |

Primary Examiner—Peter Kratz
Attorney, Agent, or Firm—Kanesaka and Takeuchi

[57] ABSTRACT

A process for producing a glass article protected from coloring by electron rays comprises preparing a soda-lime-silica glass, contacting the glass with a molten salt containing potassium ions so that sodium ions in a surface layer thereof are exchanged by potassium ions, and subjecting the glass to heat treatment so that the surface layer thereof in a depth to which the irradiated electron rays penetrate when electron rays are irradiated has a composition defined by a molar ratio of 0.4 to 0.65 for $Na_2O/(Na_2O+K_2O)$. The soda-lime-silica glass is composed of 50–75% by weight of $SiO_2$, 0.5–2.5% by weight of $Al_2O_3$, 0–0.1% by weight of $Fe_2O_3$, 5.0–14.0% by weight of CaO, 0–4.5% by weight of MgO, 5.0–16.0% by weight of $Na_2O$, 0–2.0% by weight of $K_2O$, 0–0.5% by weight of $TiO_2$, and 0–0.5% by weight of $SO_3$. The content of alkali metal oxides in the glass is 5% and above, and ratio of $Na_2O$ in the alkali metal oxides is 65% and above.

5 Claims, 4 Drawing Sheets

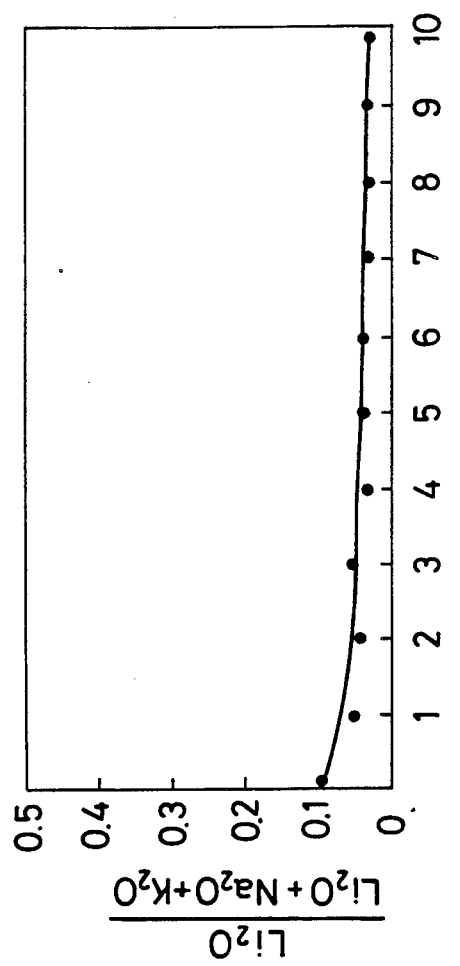

PROCESS FOR PRODUCING A GLASS ARTICLE PROTECTED FROM COLORING BY ELECTRON RAYS

This is a division of application Ser. No. 146,449, filed Jan. 21, 1988 now U.S. Pat. No. 4,897,371.

FIELD OF THE INVENTION AND RELATED ART STATEMENT

The present invention relates to a glass article protected from coloring by electron rays which is suitable for use as the glass panel of a cathode ray tube (CRT for short hereinafter) which is irradiated with electron rays, and also to a process for producing the same.

The glass panel of a CRT is subject to coloring (referred to as browning hereinafter) by bombardment with electron rays. To remedy this trouble, the glass panel is produced from glass of specific composition containing Sr, Ba, Ce, etc. The production process includes melting the glass, feeding the gob to the mold, pressing the gob, and grinding the glass panel.

A disadvantage of this production process is that it needs a special furnace to melt the glass of specific composition and also needs the grinding step after press forming. These lead to a high production cost and low productivity.

Moreover, the conventional glass panel is required to have a considerable thickness so that it withstands a pressure higher than 3 kg·f/cm$^2$ (29.4 N/cm$^2$). This leads to an increase in weight.

On the other hand, it is possible to form the glass panel of a CRT from a soda-lime-silica glass plate. Unfortunately, this glass panel is subject to browning by irradiation with electron rays.

The coloring of soda-lime-silica glass by irradiation with electron rays is presumably induced by the following mechanism. Electrons impinging upon the glass plate penetrate into the surface layer of the glass plate in proportion to the accelerating voltage of electrons, and the electrons stay there and form an electric field. This electric field causes sodium ions to move from the surface layer to the inner layer. These sodium ions form colloids composed of sodium-metal atoms in glass.

There is disclosed a process for producing glass protected from irradiation with electron rays in Japanese Patent Laid-open No. 105705/1975. This process is characterized by that lithium ions or sodium ions present in the surface layer of glass which is irradiated with electron rays are exchanged by at least one kind of potassium ions, rubidium ions, cesium ions, and hydrogen ions. However, this ion exchange process is not so effective in the prevention of browning.

There is proposed a method for preventing the coloring of glass by irradiation with electron rays in Japanese Patent Laid-open No. 153148/1987. According to this method, sodium ions in the surface layer of soda-lime-silica glass panel of a CRT which is irradiated with electron rays are exchanged by potassium ions. The ion exchange is accomplished by dipping a soda-lime-silica glass plate in potassium nitrate at 440° to 480° C. for 0.5 to 3 hours. As the result of ion exchange, the formation of colloids by sodium atoms diminishes. However, potassium ions moved from the surface layer to the inner layer form colloids composed of potassium atoms whereby the coloring of glass is diminished only a little.

OBJECTS AND SUMMARY OF THE INVENTION

It is an object of the present invention to provide a glass article which is very little subject to browning when it is irradiated with electron rays.

It is another object of the present invention to provide a glass article having a high strength.

It is further another object of the present invention to provide a process for producing said glass article at a low production cost.

The present invention includes the following seven aspects.

(1) A glass article molded from a soda-lime-silica glass molding, with the surface thereof modified so that sodium ions therein are exchanged by lithium ions and at least one kind of potassium ions, rubidium ions, and cesium ions.

(2) A process for producing said glass article which comprises contacting a soda-lime-silica glass with a molten salt containing lithium ions and at least one kind of potassium ions, rubidium ions, and cesium ions at 430° to 490° C. for 0.5 to 4 hours.

(3) A glass article produced from a glass molding composed of SiO$_2$ 69~73%, Al$_2$O$_3$ 0.5~1.5%, Fe$_2$O$_3$ 0~0.15%, CaO 7~14%, MgO 0~4.5%, Na$_2$O 12~16%, K$_2$O 0~1.5%, TiO$_2$ 0~0.1%, SO$_3$ 0~0.5%, and Li$_2$O 0.2~1.5%, with the surface thereof modified so that sodium ions therein are exchanged by potassium ions.

(4) A process for producing said glass article which comprises contacting a glass molding of said composition with a molten salt containing potassium ions at 430° to 490° C.

(5) A process for producing a glass article protected from coloring by irradiation with electron rays which comprises contacting a soda-lime-silica glass with a molten salt containing potassium ions and at least one kind of calcium ions, barium ions, and strontium ions so that the surface layer of the glass has a composition defined by a molar ratio of 0.4 to 0.65 for Na$_2$O/(Na$_2$O+K$_2$O), said surface layer having a depth to which the irradiated electrons penetrate. (This depth is referred to as the maximum range hereinafter.)

(6) A process for producing a glass article which comprises contacting a soda-lime-silica glass with a molten salt containing potassium ions and lithium ions and subsequently subjecting the glass to heat treatment so that the surface layer from the surface to the maximum range has a composition defined by a molar ratio of 0.4 to 0.65 for Na$_2$O/(Na$_2$O+K$_2$O) and by a molar ratio of 0.05 to 0.3 for Li$_2$O/(total amount of alkali-metal oxides).

(7) A process for producing a glass article which comprises contacting a soda-lime silica glass with a molten salt containing potassium ions and subsequently subjecting the glass to heat treatment so that the surface layer from the surface to the maximum range has a composition defined by a molar ratio of 0.4 to 0.65 for Na$_2$O/(Na$_2$O+K$_2$O).

BRIEF DESCRIPTION OF THE DRAWINGS

FIG. 4 is a graph showing the molar ratio of Li₂O/(Li₂O+Na₂O+K₂O) in the surface layer of the glass panel of Example 8.

DETAILED DESCRIPTION OF THE PREFERRED EMBODIMENTS

Figure 1:
FIG. 1 is a sectional view of a CRT glass panel pertaining to one embodiment of the present invention.

The glass article pertaining to the first aspect of the present invention is a molded glass plate of commercial soda-lime-silica glass, with the surface thereof, which is irradiated with electron rays, modified so that sodium ions therein are exchanged by lithium ions and at least one kind of potassium ions, rubidium ions, and cesium ions.

The partial exchange of sodium ions with lithium ions and at least one kind of potassium ions, rubidium ions, and cesium ions produces the "mixed alkali effect", which makes the glass plate less liable to browning by irradiation with electron rays and forms a compressed layer in the glass surface, leading to increased glass strength.

Lithium ions exchanged with exchanged the sodium ions are present in the form of lithium oxide in the glass. The average content of lithium oxide should preferably be 0.1~3 wt % in a depth of 10 μm to which electron rays penetrate from the irradiated surface. With an average content of lithium oxide in excess of 3 wt %, the glass molding has a low strength and, in an extreme case, has a turbid surface and fine surface cracks.

The exchange of sodium ions by potassium ions, rubidium ions, and cesium ions should preferably take place in a depth of 5 to 20 μm from the surface. The exchange in an excessively shallow or deep layer does not produce the effect of preventing browning.

The soda-lime-silica glass molding is one which is produced by float process. It has a composition of SiO₂ 69~73%, Al₂O₃ 0.5~1.5%, Fe₂O₃ 0~0.15%, CaO 7~14%, MgO 0~4.5%, Na₂O 12~16%, K₂O 0-1.5%, TiO₂ 0~0.1%, and SO₃ 0~0.5% by weight. Moreover, it is desirable that the surface of the glass molding which is irradiated with electron rays is opposite to the side which comes into contact with molten tin in the float bath. Otherwise, the surface of the molding is slow to undergo the ion exchange and the tin present on the glass surface tends to cause browning.

The glass article pertaining to the first aspect of the present invention is produced by the process pertaining to the second aspect of the present invention. According to the process, a CRT glass plate of desired shape is formed from soda-lime-silica glass and the resulting molding is dipped in a molten salt containing lithium ions and at least one kind of potassium ions, rubidium ions, and cesium ions at 430° to 490° C. for 0.5 to 4 hours, so that sodium ions in the surface of the glass molding are exchanged by lithium ions and at least one kind of potassium ions, rubidium ions, and cesium ions.

According to the process pertaining to the second aspect of the present invention, the amount of lithium ions in the molten salt bath based on the total amount of at least one kind of potassium ions, rubidium ions, and cesium ions should preferably be 0.04~0.4 mol %. If the amount of lithium ions is higher than 0.4 mol %, the resulting glass article has a low strength and, in an extreme case, has a turbid surface and fine surface cracks.

In the case where the glass molding is produced by forming a glass plate, it is possible to keep the glass surface flat without grinding and polishing it.

The glass article pertaining to the first aspect of the present invention is characterized by that the surface thereof is treated so that sodium ions therein are partly exchanged by lithium ions and at least one kind of potassium ions, rubidium ions, and cesium ions. The thus treated glass surface is very little subject to browning when irradiated with electron rays. This leads to an advantage that a commercial soda-lime-silica glass plate can be used as a raw material for the CRT glass panel, and that the glass panel can be produced without a grinding and polishing step and hence at a low cost.

The glass panel produced according to the present invention has an increased strength and hence it outperforms the conventional one with a smaller thickness, because the glass surface has a compressed surface layer which is formed by the partial exchange of sodium ions in the surface layer by at least one kind of potassium ions, rubidium ions, and cesium ions.

The glass article pertaining to the third aspect of the present invention is characterized by that the surface thereof which is irradiated with electron rays is modified so that sodium ions are exchanged by potassium ions. It is made from a glass plate composed of SiO₂ 69~73%, Al₂O₃ 0.5~1.5%, Fe₂O₃ 0~0.15%, CaO 7~14%, MgO 0~4.5%, Na₂O 12~16%, K₂O 0~1.5%, TiO₂ 0~0.1%, SO₃ 0~0.5%, and Li₂O 0.2~1.5% by weight.

The third aspect of the present invention is based on the following knowledge. The browning caused by electron rays takes place because alkali ions in the outermost layer of glass move inward when the glass is irradiated with electron rays and they change into metallic alkali atoms in a depth of 0.5~8 μm from the surface. It is known that when there are two or more kinds of alkalis in glass, they prevent browning owing to the mixed alkali effect. Moreover, browning can be prevented more effectively when 0.2~1.5 wt % of Li₂O is added in addition to Na₂O and K₂O. If the amount of Li₂O is less than 0.2 wt %, browning is not effectively prevented. If the amount of Li₂O is higher than 1.5 wt %, the effect of preventing browning levels off. The weight ratio of Na₂O/(Na₂O+K₂O) should be 0.2~0.6. Outside this range, the effect of preventing browning is little.

The depth of the layer in which coloring takes place by irradiation with electron rays is determined by the distance to which electron rays penetrate. The depth is expressed by the following formula. (Thomson - Widington Law)

$$D = \frac{V^2}{\beta d}$$

where D (cm) is a depth in glass to which electron rays penetrate; V (volt) is an accelerating voltage of electron rays; d(g/cm³) is a density of glass; and β is a constant $6.2 \times 10^{11}$ volt²·cm²/g.

Therefore, if the accelerating voltage V (volt) of electron rays is 10 kV, 20 kV, and 30 kV, the electron rays will penetrate to a depth of 0.62 μm, 2.48 μm, and 5.58 μm, respectively. Electron ray was found experimentally to penetrate to a depth of 0.5 to 1.5 μm, 0.75 to 4 μm and 2.0 to 6.5 respectively when the electron ray was irradiated on a surface of soda-lime-silica glass under an accelerating voltage of 10 kV, 20 kV and 30 kV.

These facts suggest that if the composition of the surface layer of a glass molding to which the irradiated electron rays penetrate is adjusted so that the content of Li$_2$O is 0.2~1.5 wt % and the weight ratio of Na$_2$O/(Na$_2$O+K$_2$O) is 0.2~0.6 the glass article is protected from browning by electron rays and has a high strength.

Therefore, the glass molding pertaining to the third aspect of the present invention should have the composition defined as follows: The content of Li$_2$O in the surface layer deeper than 0.5 μm is 0.2~1.5 wt %, with the weight ratio of Na$_2$O/(Na$_2$O+K$_2$O) being 0.2~0.6.

A glass article like this is produced by the process pertaining to the fourth aspect of the invention. According to the process, a glass plate composed of SiO$_2$ 69~73%, Al$_2$O$_3$ 0.5~1.5%, Fe$_2$O$_3$ 0~0.15%, CaO 7~14%, MgO 0~4.5%, Na$_2$O 12~16%, K$_2$O 0~1.5%, TiO$_2$ 0~0.1%, SO$_3$ 0~0.5%, and Li$_2$O 0.2~1.5% by weight, is formed into a desired shape and the glass plate is dipped in a molten salt bath containing potassium ions at 430° to 490° C. for a prescribed period of time, so that sodium ions in the surface layer are partly exchanged by potassium ions.

Better results are obtained when a glass plate of the above-mentioned composition produced by float process is formed into a CRT glass panel and the glass panel is dipped in a molten salt bath containing potassium ions at 430° to 490° C. so that sodium ions in the surface layer of the glass panel are partly exchanged by potassium ions. The ion exchange protects the glass panel from browning by electron rays and produces compression stress in the glass surface, thereby increasing the glass strength.

An advantage of the ion exchange process is that it is possible to control the depth of the surface layer in which the ion exchange takes place by adjusting the period of time during which the glass panel is dipped in the molten salt bath. Thus the dipping time for ion exchange may be properly established according to the accelerating voltage of a CRT.

The above-mentioned glass composition (SiO$_2$ 69~73%, Al$_2$O$_3$ 0.5~1.5%, Fe$_2$O$_3$ 0~0.15%, CaO 7~14%, MgO 0~4.5%, Na$_2$O 12~16%, K$_2$O 0~1.5%, TiO$_2$0~0.1%, SO$_3$ 0~0.5%, and Li$_2$O 0.2~1.5% by weight) can be obtained using a furnace for the production of soda-lime-silica glass. Therefore, glass article of the present invention can be produced without using a special furnace. This is advantageous in production cost. In addition, if the glass article of the present invention is produced from a glass plate made by float process, it has a smooth surface and needs no polishing after molding.

In the case where the suppression of browning is accomplished by dipping a commercial soda-lime-silica glass plate in a molten salt containing both potassium ions and lithium ions, the glass strength can decrease on account of the exchange of soda by lithium. This makes it necessary to increase the thickness of the glass plate where the glass plate is used as a vacuum container such as a CRT. Increasing the thickness is disadvantageous in production cost and weight reduction of CRTs.

By contrast, the glass article pertaining to the third and fourth aspects of the present invention has an advantage over the conventional one. The partial exchange of sodium ions by potassium ions renders the glass panel resistant to browning by electron rays on account of the mixed alkali effect. Moreover, it forms a compressed layer of the glass surface and thereby increases the glass strength.

The glass article pertaining to the fourth aspect of the present invention is made of a glass plate composed of SiO$_2$ 69~73%, Al$_2$O$_3$ 0.5~1.5%, Fe$_2$O$_3$ 0~0.15%, CaO 7~14%, MgO 0~4.5%, Na$_2$O 12~16%, K$_2$O 0~1.5%, TiO$_2$ 0~0.1%, SO$_3$ 0~0.5%, and Li$_2$O 0.2~1.5% by weight, with the surface thereof modified such that sodium ions therein are partly exchanged by potassium ions. Therefore, it is very little subject to browning when irradiated with electron rays. In addition, it is improved in strength owing to the ion exchange, and therefore, it outperforms the conventional panel with a smaller thickness. It can be obtained using a furnace for the production of soda-lime-silica glass. Therefore, a glass article of the present invention can be produced without using a special furnace. This is advantageous in production cost. In addition, if the glass article of the present invention is produced from a glass plate made by float process, it has a smooth surface and needs no polishing after molding.

The fifth aspect of the present invention is concerned with a process for producing a glass article protected from coloring by electron rays. According to this process, a glass molding formed from soda-lime-silica glass is dipped in a molten salt bath containing potassium ions and at least one kind of calcium ions, barium ions, and strontium ions, so that sodium ions in the surface layer thereof are partly exchanged by potassium ions. The ion exchange is accomplished to such an extent that the molar ratio of Na$_2$O/(Na$_2$O+K$_2$O) becomes 0.4~0.65 in the surface layer to the depth of maximum range from the surface.

When soda-lime-silica glass is brought into contact with a molten salt bath containing potassium ions and at least one kind of calcium ions, barium ions, and strontium ions, the exchange of sodium ions by potassium ions is suppressed by the action of at least one kind of calcium ions, barium ions, and strontium ions. Thus it is possible to control the molar ratio of Na$_2$O to the total amount of Na$_2$O and K$_2$O to 0.4~0.65.

As mentioned above, the depth in glass (maximum range) to which electron rays penetrate is determined by the accelerating voltage of electron rays, and it is known that the depth can be expressed by the formula $$D = \frac{V^2}{\beta d}$$

where D (cm) is a depth in glass to which electron rays penetrate; V (volt) is an accelerating voltage of electron rays; d (g/cm$^3$) is a density of glass; and β is a constant 6.2×10$^{11}$ volt$^2$·cm$^2$/g.

Therefore, if the accelerating voltage V (volt) of electron rays is 10 kV, 20 kV, and 30 kV, the electron rays will penetrate to a depth of 0.62 μm, 2.48 μm, and 5.58 μm, respectively. Electron ray was found experimentally to penetrate to a depth of 0.5 to 1.5 μm, 0.75 to 4 μm and 2.0 to 6.5 μm respectively when the electron ray was irradiated on a surface of sodium-lime-silica glass under an accelerating voltage of 10 kV, 20 kV and 30 kV.

The period of time for treatment in a molten salt bath should be determined in proportion to the anticipated accelerating voltage of electron rays or the maximum range. Thus it is necessary to carry out the treatment with a salt containing potassium ions and strontium ions, etc. so that the surface layer within the maximum range has a composition defined by the molar ratio of $Na_2O$ to the total amount of $Na_2O$ and $K_2O$ which is 0.4~0.65.

According to the fifth aspect of the present invention, the molten salt used for the treatment of soda-lime-silica glass should contain 99.90~99.99 mol % of a salt containing potassium ions. The treatment with the molten salt should preferably be performed at 440° to 480° C. for 0.5 to 4 hours.

The sixth aspect of the present invention is concerned with a process for producing a glass article protected from coloring by electron rays. According to this process, a glass molding formed from soda-lime-silica glass is dipped in a molten salt bath containing potassium ions and lithium ions, so that sodium ions in the surface layer of the glass molding are exchanged by potassium ions and lithium ions. The treated glass article further undergoes heat treatment. The heat treatment may be performed when the article is in a heating process (such as a sealing or baking process) during an assembling process of a CRT. The treatment process may be performed itself. The ion exchange is accomplished to such an extent that the molar ratio of $Na_2O/(Na_2O+K_2O)$ becomes 0.4~0.65 and that the molar ratio of $Li_2O$/(total amount of alkali-metal oxides) becomes 0.05~0.3 in the surface layer almost to the depth of maximum range from the surface.

When a molar ratio for $Na_2/(Na_2O+K_2O)$ is 0.4 to 0.65, sodium ions and potassium ions move with smaller diffusion velocity than other molar ratios, whereby alkali ions move so slowly that the formation of the colloids is diminished and the glass article decreases to discolor. An addition of $Li_2O$ with a molar ratio of 0.05 to 0.3 lowers the diffusion velocity, whereby the glass article diminishes further to discolor. A molar ratio of $Li_2O$ of less than 0.05 or more than 0.3 will increase the diffusion velocity and make liable the glass to discolor.

Upon contact with a molten salt containing potassium ions and lithium ions, the surface layer of the soda-lime-silica glass undergoes change in composition. That is, 70~100% of sodium ions in the surface layer is exchanged by potassium ions and lithium ions. The subsequent heat treatment causes sodium ions and potassium ions to diffuse to the depth of maximum range from the surface. As the result, the composition in the surface layer of that depth has a composition defined by the molar ratio of $Na_2O$ to the total amount of $Na_2O$ and $K_2O$ which is 0.4~0.65 and by the molar ratio of $Li_2O$ to the total amount of alkali-metal oxides which is 0.05~0.3.

As mentioned above, by the depth in glass (maximum range) to which electron rays penetrate is determined accelerating voltage of electron rays.

If the accelerating voltage V (volt) of electron rays is 10 kV, 20 kV, and 30 kV, the electron rays will penetrate to a depth of 2.5 μm, 4.5 μm, and 7.5 μm, respectively. Electron ray was found experimentally to penetrate to a depth of 0.5 to 1.5 μm, 0.75 to 4 μm and 2.0 to 6.5 μm respectively when the electron ray was irradiated on a surface of soda-lime-silica glass under an accelerating voltage of 10 kV, 20 kV and 30 kV.

The adequate temperature and time for the treatment should be established according to the anticipated accelerating voltage of electron rays and the conditions of ion exchange, so that the molar ratio of $Na_2O$ to the total amount of $Na_2O$ and $K_2O$ becomes 0.4~0.65. In general, the ion exchange and heat treatment require a higher temperature and a longer time as the anticipated accelerating voltage of electron rays increases.

According to the sixth aspect of the present invention, potassium nitrate and lithium nitrate are used as the molten salt containing potassium ions and lithium ions. In this case, the molten salt should preferably be kept at 440° to 480° C. and the dipping time should preferably be 0.5 to 4 hours. The heat treatment should be performed at 440° to 480° C. for 1 to 10 hours.

The seventh aspect of the present invention is concerned with a process for producing a glass article protected from coloring by electron rays. According to this process, a glass molding formed from soda-lime-silica glass is dipped in a molten salt bath containing potassium ions, so that sodium ions in the surface layer of the glass molding are exchanged by potassium ions. The treated glass article further undergoes heat treatment. The ion exchange is accomplished to such an extent that the molar ratio of $Na_2O/(Na_2O+K_2O)$ becomes 0.4~0.65 in the surface layer to the depth of maximum range from the surface.

Upon contact with a molten salt containing potassium ions, the surface layer of the soda-lime-silica glass undergoes change in composition. That is, 70~80% of sodium ions in the surface layer is exchanged by potassium ions, and the surface layer contains both sodium ions and potassium ions. The subsequent heat treatment causes sodium ions and potassium ions to diffuse to the depth of maximum range from the surface. As the result, the composition in the surface layer of that depth has a composition defined by the molar ratio of $Na_2O$ to the total amount of $Na_2O$ and $K_2O$ which is 0.4~0.65.

As mentioned above, the depth in glass (maximum range) to which electron rays penetrate is determined by the accelerating voltage of electron rays as expressed by the formula $$D = \frac{V^2}{\beta d}$$

Therefore, if the accelerating voltage V (volt) of electron rays is 10 kV, 20 kV, and 30 kV, the electron rays will penetrate to a depth of 0.62 μm, 2.48 μm, and 5.58 μm, respectively.

The adequate temperature and time for the treatment should be established according to the anticipated accelerating voltage of electron rays and the conditions of ion exchange, so that the molar ratio of $Na_2O$ to the total amount of $Na_2O$ and $K_2O$ becomes 0.4~0.65. In general, the ion exchange and heat treatment require a higher temperature and a longer time as the anticipated accelerating voltage of electron rays increases.

According to the seventh aspect of the present invention, potassium nitrate is used as the molten salt containing potassium ions. In this case, the molten salt should preferably be kept at 440° to 480° C. and the dipping time should preferably be 0.5 to 4 hours, and the heat treatment should be performed at 440° to 480° C. for 1 to 10 hours.

According to the fifth, sixth and seventh aspects of the present invention, soda-lime-silica glass is used. The preferred composition of the glass is shown in Table 1.

TABLE 1

Composition of Soda-lime-silica Glass

| Component | Wt % |
| --- | --- |
| $SiO_2$ | 50~75 |
| $Al_2O_3$ | 0.5~2.5 |
| MgO | 0~4.5 |
| CaO | 5.0~14.0 |
| $Na_2O$ | 5.0~16.0 |
| $K_2O$ | 0~2.0 |
| $Fe_2O_3$ | 0~1.0 |
| $TiO_2$ | 0~0.5 |
| $SO_3$ | 0~0.5 |

The glass used in the fifth sixth and seven aspects of the present invention should have such a composition that the alkali metal oxide accounts for 5 wt % and more, preferably 10 wt % and more, in the glass and sodium oxide accounts for 65 wt % and more, preferably 80 wt % and more, in the alkali metal oxide. With a composition outside this range, the glass article is poor in resistance to coloring by electron rays.

According to the fifth aspect of the present invention, the surface layer of the glass up to a depth of the maximum range is modifies such that the molar ratio of $Na_2O$ to the total amount of $Na_2O$ and $K_2O$ is 0.4~0.65. The sodium ions and potassium ions present together in the surface layer are less mobile in the glass and hence less liable to form the colloids of alkali-metal atoms. For this reason, the glass article of the present invention is protected from coloring by electron rays.

When the sodium ions, potassium ions and lithium ions present together in the surface layer, the glass article diminishes to discolor further than when two kinds of alkali ions present together therein.

According to the present invention, it is not necessary to use glass of special composition containing a large amount of potassium oxide for the prevention of coloring by electron rays. Therefore, the production of the glass article of the present invention does not need a special furnace and an expensive raw material. The glass article of the present invention is superior in resistance to coloring by electron rays to the conventional glass for picture tubes of color television.

The invention will be more clearly understood with reference to the following examples.

EXAMPLES 1 to 3 and COMPARATIVE EXAMPLE 1

A glass panel, 300 mm wide, 370 mm long, and 50 mm high, having a flat surface as shown in FIG. 1 was produced from a soda-lime-silica glass plate formed by float process, by heating and vacuum forming in combination with pressing. After pretreatment at about 200° C. for about 30 minutes, the glass panel was dipped in a molten salt bath composed of potassium nitrate and lithium nitrate at 460° C. for 2 hours. The content of lithium nitrate in the molten salt bath was 0 mol % in Comparative Example 1, 0.04 mol % in Example 1, 0.15 mol % in Example 2, and 0.4 mol % in Example 3. After dipping, the glass panel was washed.

Table 2 shows the average concentration (wt %) of lithium oxide in the surface layer up to a depth of 10 μm from the surface of the glass panel. Table 2 also shows the molar ratio of $Na_2/(Na_2O+K_2O)$ in the same surface layer.

The glass panel obtained by the above-mentioned process was irradiated with electron rays for 300 hours using an electron gun (cathode voltage: 21 kV, cathode current 300 μA, and surface current density: 1.00 μA/cm²). After that, the glass panel was examined for light transmittance at a wavelength of 400 nm. The change of absorbance IN ($T_0/T$) is shown in Table 2. ($T_0$ and T stand for the transmittance of light before and after irradiation with electron rays.)

It is apparently noted from Table 2 that browning in Examples 1 to 3 (in which the concentration of lithium nitrate is 0.04 to 0.4 mol %) was less severe than in Comparative Example 1 (in which lithium nitrate is not contained.) It was found that compressive stress is present in the surface layer of the glass panel, and owing to it the glass panel has an increased strength.

TABLE 2

| | Lithium nitrate (mol %) | Ave. conc. (wt %) of lithium oxide across depth | $Na_2O/$ $(Na_2O + K_2O)$ (molar ratio) | Change of absorbance In ($T_0/T$) |
| --- | --- | --- | --- | --- |
| Comparative Example 1 | 0 | 0 | 0.55 | 0.075 |
| Example 1 | 0.04 | 0.1 | 0.6 | 0.055 |
| Example 2 | 0.15 | 1.0 | 0.6 | 0.035 |
| Example 3 | 0.4 | 1.5 | 0.55 | 0.025 |

EXAMPLES 4 to 6 and COMPARATIVE EXAMPLES 2 and 3

A glass panel, 300 mm wide, 370 mm long, and 50 mm high, having a flat surface as shown in FIG. 1 was produced from a glass plate having the composition as shown in Table 3, by heating and vacuum forming in combination with pressing. After pretreatment at about 200° C. for about 30 minutes, the glass panel was dipped in a molten salt of potassium nitrate at 460° C. for 2 hours. After dipping, the glass panel was washed. For comparison (Comparative Example 3), the same glass panel was produced from glass for color TV picture tubes having the browning-resistant composition as shown in Table 4.

TABLE 3

| Component | Example 4 | Example 5 | Example 6 | (wt %) Comparative Example 2 |
| --- | --- | --- | --- | --- |
| $SiO_2$ | 71.31 | 71.31 | 71.31 | 71.31 |
| $Al_2O_3$ | 1.44 | 1.44 | 1.44 | 1.44 |
| $Fe_2O_3$ | 0.094 | 0.094 | 0.094 | 0.094 |
| CaO | 8.86 | 8.86 | 8.86 | 8.86 |
| MgO | 3.86 | 3.86 | 3.86 | 3.86 |
| $Li_2O$ | 0.2 | 0.5 | 1.0 | 0 |
| $Na_2O + Li_2O$ | 13.29 | 13.29 | 13.29 | 13.29 |
| $K_2O$ | 0.83 | 0.83 | 0.83 | 0.83 |
| $TiO_2$ | 0.03 | 0.03 | 0.03 | 0.03 |
| $SO_3$ | 0.21 | 0.21 | 0.21 | 0.21 |

TABLE 4

| Component | Wt % |
| --- | --- |
| $SiO_2$ | 56.8 |
| $Al_2O_3$ | 2.07 |
| MgO | 0.83 |
| CaO | 0.23 |
| SrO | 9.1 |
| BaO | 11.5 |
| ZnO | 2.41 |
| $Li_2O$ | 0.41 |
| $Na_2O$ | 7.2 |
| $K_2O$ | 7.23 |
| $CeO_2$ | 0.63 |
| $TiO_2$ | 0.57 |
| $ZrO_2$ | 1.73 |
| $Fe_2O_3$ | 0.035 |

TABLE 4-continued

| Component | Wt % |
|---|---|
| $Sb_2O_3$ | 0.14 |

Table 5 shows the ratio by weight of $Na_2O/(Na_2O+K_2O)$ in the same surface layer of the glass panel up to a depth of 2.5 μm from the surface.

A test pieces cut out of the glass panel obtained by the above-mentioned process was irradiated with electron rays for 300 hours using an electron gun (cathode voltage: 20 kV, cathode current: 300 μA, and surface current density: 1.00 μA/cm$^2$). After that, the glass panel was examined for light transmittance at a wavelength of 400 nm. The change of absorbance IN ($T_0/T$) is shown in Table 5. ($T_0$ and T stand for the transmittance of light before and after irradiation with electron rays.)

It is apparently noted from Table 5 that glass panels in Examples 4 to 6 (in which the concentration of lithium oxide is 0.2 to 1.0 wt %) have a good registance to browning. It was found that compressive stress (80 kg/cm$^2$) is present in the surface layer of the glass panel, and owing to it the glass panel has an increased strength.

TABLE 5

| | Lithium oxide (wt %) | Ratio by weight of $Na_2O/(Na_2O + K_2O)$ | Change of absorbance In ($T_0/T$) |
|---|---|---|---|
| Example 4 | 0.2 | 0.6 | 0.20 |
| Example 5 | 0.5 | 0.6 | 0.055 |
| Example 6 | 1.0 | 0.55 | 0.055 |
| Comparative Example 2 | 0 | 0.55 | 0.35 |
| Comparative Example 3 | 0.41 | 0.50 | 0.25 |

EXAMPLE 7 and COMPARATIVE EXAMPLES 4 and 5

A 3-mm thick glass plate formed by float process, having the composition as shown in Table 6 underwent ion exchange. The glass plate was irradiated with electron rays. The coloring caused by the irradiation was evaluated by measuring the change of transmittance.

TABLE 6

| Composition of Glass Plate | |
|---|---|
| Component | Wt % |
| $SiO_2$ | 72.92 |
| $Al_2O_3$ | 1.70 |
| MgO | 3.83 |
| CaO | 7.52 |
| $Na_2O$ | 13.38 |
| $K_2O$ | 0.70 |
| $Fe_2O_3$ | 0.08 |
| $SO_3$ | 0.30 |

The ion exchange was carried out under the following conditions.
Molten salt: Potassium nitrate (purity 99.9%) 99.975 mol % Strontium nitrate 0.025 mol %
Bath temperature: 460° C.
Dipping time: 1 hour
The irradiation of electron rays was carried out under the following conditions.
Accelerating voltage: 10 kV
Surface current density: 2.0 μA/cm$^2$
Irradiation time: 200 hours The thus obtained test piece was examined for transmittance of light with a wavelength of 400 nm. The results are shown in Table 7.

TABLE 7

| | Conditions for ion exchange | Transmittance before irradiation | Transmittance after irradiation |
|---|---|---|---|
| Example 7 | With strontium | 90 | 84 |
| Comparative Example 4 | Without strontium | 90 | 44 |
| Comparative Example 5 | Picture tube glass | 88 | 56 |

Figure 2:
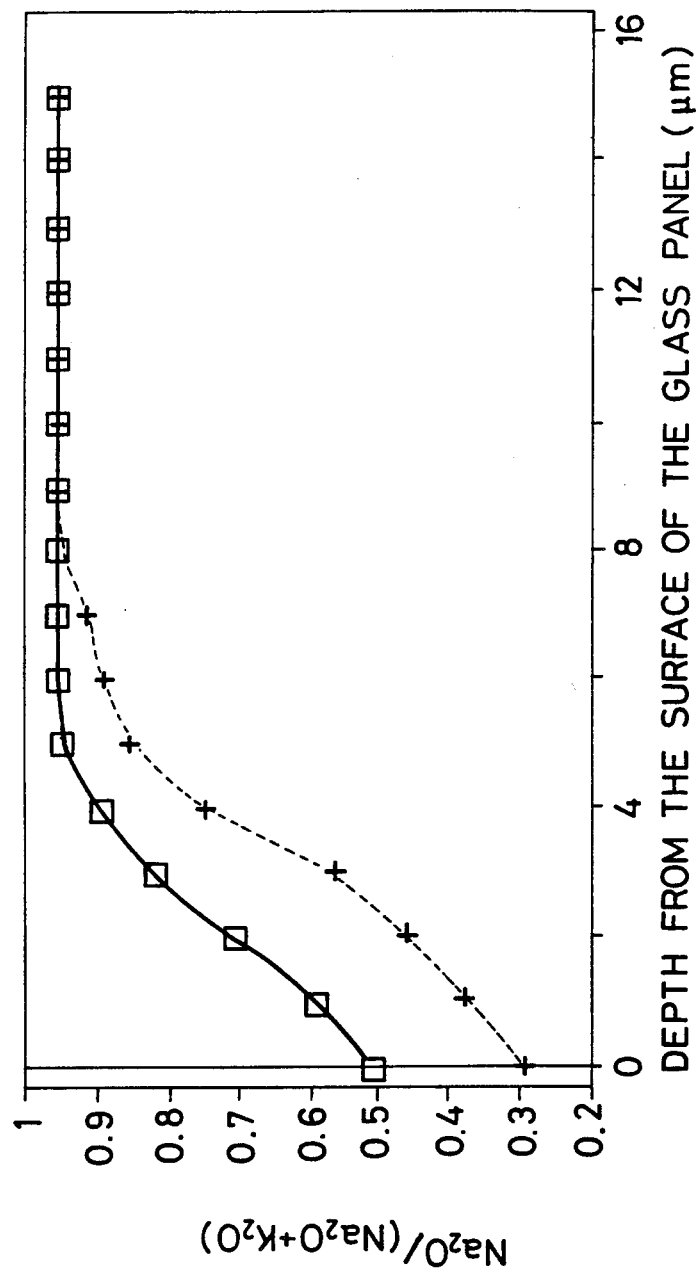
FIG. 2 is a graph showing the molar ratio of Na$_2$O/(Na$_2$O+K$_2$O) in the surface layer of the glass panel. (The solid line indicates the data in Example 7 and the broken line indicates the data in Comparative Example 5.)

The molar ratio of $Na_2/(Na_2O+K_2O)$ in the surface layer of the above-mentioned glass plate was measured using an X-ray microanalyzer (XMA). The results are shown in FIG. 2 (solid line).

In Comparative Example 4, the above-mentioned glass plate was treated with molten potassium nitrate at 460° C. for 1 hour and the treated glass plate was examined for light transmittance (400 nm) before and after irradiation with electron rays. In Comparative Example 5, a commercial glass plate for color picture tubes was examined for light transmittance (400 nm) before and after irradiation with electron rays. The results are shown in Table 7. The molar ratio of $Na_2/(Na_2O+K_2O)$ in the surface layer of the plate in Comparative Example 5 was measured. The results are shown in FIG. 2 (broken line). It is noted from Table 7 and FIG. 2 that the glass panel of the present invention decreases much less in transmittance after irradiation with electron rays than that in Comparative Examples 4 and 5.

EXAMPLE 8 and COMPARATIVE EXAMPLES 6 and 7

A 3-mm thick glass plate formed by float process, having the composition as shown in Table 6 underwent ion exchange and subsequent heat treatment. The glass plate was irradiated with electron rays. The coloring caused by the irradiation was evaluated by measuring the change of transmittance.

The ion exchange was carried out under the following conditions.
Molten salt: Potassium nitrate (purity 99.9%) 99.9 wt % Lithium nitrate 0.1 wt %
Bath temperature: 460° C.
Dipping time: 3 hour
Heat treatment: at 460° C. for 4 hours.
The irradiation of electron rays was carried out under the following conditions.
Accelerating voltage: 10 kV
Surface current density: 35 μA/cm$^2$
Irradiation time: 20 hours The thus obtained test piece was examined for transmittance of light with a wavelength of 400 nm. The results are shown in Table 8.

TABLE 8

| | Ion exchange | | Heat treatment | Transmittance before irradiation | Transmittance after irradiation |
|---|---|---|---|---|---|
| Example 8 | Yes | $KNO_3$ $LiNO_3$ | yes | 90 | 75 |
| Comparative Example 6 | | yes | no | 90 | 35 |

TABLE 8-continued

|  | Ion exchange | Heat treatment | Transmittance before irradiation | Transmittance after irradiation |
|---|---|---|---|---|
| Comparative Example 7 | Picture tube glass | | 88 | 50 |

Figure 3:
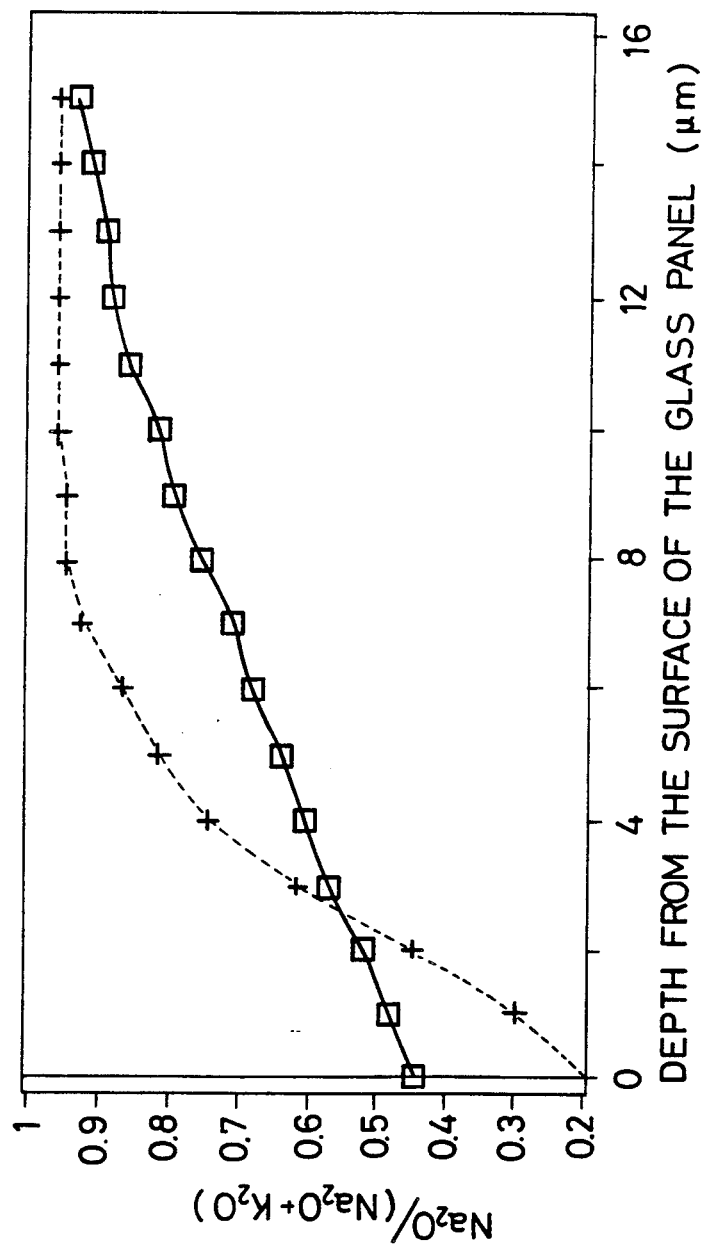
FIG. 3 is a graph showing the molar ratio of Na₂O/(Na₂O+K₂O) in the surface layer of the glass panel. (The solid line indicates the data in Example 8 and the broken line indicates the data in Comparative Example 6.)

The molar ratio of $Na_2O/(Na_2O+K_2O)$ in the surface layer of the above-mentioned glass plate was measured using an X-ray microanalyzer (XMA). The results are shown in FIG. 3 (solid line). FIG. 4 shows the molar ratio of $Li_2O/(Li_2O+Na_2O+K_2O)$ in the example 8.

In Comparative Example 6, the above-mentioned glass plate underwent ion exchange but did not undergo heat treatment. In Comparative Example 7, a commercial glass plate for color picture tubes had the composition as shown in Table 4. These glass plates in Comparative Example 6 and Comparative Example 7 were examined for light transmittance (400 nm) before and after irradiation with electron rays. The results are shown in Table 8. The molar ratio of $Na_2O/(Na_2O+K_2O)$ in the surface layer of the plate in Comparative Example 6 was measured. The results are shown in FIG. 3 (broken line). It is noted from Table 8 and FIG. 3 that the glass panel of the present invention decreases much less in transmittance after irradiation with electron rays than that in Comparative Examples 6 and 7.

EXAMPLE 9 and COMPARATIVE EXAMPLES 8 and 9

A 3-mm thick glass plate formed by float process, having the composition as shown in Table 6 underwent ion exchange and subsequent heat treatment. The glass plate was irradiated with electron rays. The coloring caused by the irradiation was evaluated by measuring the change of transmittance.

The ion exchange was carried out under the following conditions.
Molten salt: Potassium nitrate (purity 99.9%)
Bath temperature: 460° C.
Dipping time: 2 hour
Heat treatment: at 460° C. for 4 hours.

The irradiation of electron rays was carried out under the following conditions.
Accelerating voltage: 10 kV
Surface current density: 2.0 µA/cm²
Irradiation time: 200 hours The thus obtained test piece was examined for transmittance of light with a wavelength of 400 nm. The results are shown in Table 9.

TABLE 9

|  | Ion exchange | Heat treatment | Transmittance before irradiation | Transmittance after irradiation |
|---|---|---|---|---|
| Example 9 | yes | yes | 90 | 84 |
| Comparative Example 8 | yes | no | 90 | 42 |
| Comparative Example 9 | Picture tube glass | | 88 | 56 |

The molar ratio of $Na_2O/(Na_2O+K_2O)$ in the surface layer of the above-mentioned glass plate was measured using an X-ray microanalyzer (XMA). The results are almost same as shown in FIG. 3 (solid line).

In Comparative Example 8, the above-mentioned glass underwent ion exchange but did not undergo heat treatment. In Comparative Example 9, a commercial glass plate for color picture tubes had the composition as shown in Table 4. These glass plates in Comparative Example 8 and Comparative Example 9 were examined for light transmittance (400 nm) before and after irradiation with electron rays. The results are shown in Table 9. The molar ratio of $Na_2O/(Na_2O+K_2O)$ in the surface layer of the plate in Comparative Example 8 was measured. The results are almost same as shown in FIG. 3 (broken line). It is noted from Table 9 and FIG. 3 that the glass panel of the present invention decreases much less in transmittance after irradiation with electron rays than that in Comparative Examples 8 and 9.

What is claimed is:

1. A process for producing a glass article protected from coloring by electron rays, comprising:
   preparing a soda-lime-silica glass composed of 50–75% by weight of $SiO_2$, 0.5–2.5% by weight of $Al_2O_3$, 0–1.0 % by weight of $Fe_2O_3$, 5.0–14.0% by weight of CaO, 0–4.5% by weight of MgO, 5.0–16.0% by weight of $Na_2O$, 0–2.0% by weight of $K_2$, 0–0.5% by weight of $TiO_2$, and 0–0.5% by weight of $SO_3$, content of alkali metal oxides in the glass being 5% and above, and ratio of $Na_2O$ in the alkali metal oxides being 65% and above,
   contacting said soda-lime-silica glass with a molten salt containing potassium ions so that sodium ions in a surface layer thereof are exchanged by potassium ions, and
   subjecting the glass to heat treatment so that the surface layer thereof in a depth to which irradiated electron rays penetrate when electron rays are irradiated has a composition defined by a molar ratio of 0.4 to 0.65 for $Na_2O/(Na_2O+K_2O)$.

2. A process for producing a glass article as claimed in claim 1, wherein the depth that the irradiated electron rays penetrate is 0.62–5.58 micra.

3. A process for producing a glass article as claimed in claim 1 wherein the molten salt is potassium nitrate and the glass is dipped in the molten salt at 440° to 480° C. for 0.5 to 4 hours.

4. A process for producing a glass article as claimed in claim 1 wherein the glass is subjected to heat treatment at 440° to 480° C. for 1 to 10 hours.

5. A process for producing a glass article as claimed in claim 1 wherein the glass molding is dipped in the molten salt so that 70 to 80% of sodium ions in the surface layer thereof is exchanged by potassium ions.

* * * * *